(12) United States Patent
Bhaduri et al.

(10) Patent No.: US 9,856,163 B2
(45) Date of Patent: Jan. 2, 2018

(54) NANOCOMPOSITE MATERIAL

(71) Applicant: Owens-Brockway Glass Container Inc., Perrysburg, OH (US)

(72) Inventors: Sutapa Bhaduri, Holland, OH (US); Olexsander Manulyk, Oshawa (CA)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 14/687,114

(22) Filed: Apr. 15, 2015

(65) Prior Publication Data

US 2016/0304381 A1    Oct. 20, 2016

(51) Int. Cl.
| | |
|---|---|
| C03B 5/43 | (2006.01) |
| C23D 5/00 | (2006.01) |
| F27D 1/00 | (2006.01) |
| C23C 22/73 | (2006.01) |
| C03B 5/167 | (2006.01) |
| C03B 5/425 | (2006.01) |
| C03C 27/02 | (2006.01) |
| C03C 3/078 | (2006.01) |
| C03C 14/00 | (2006.01) |
| C22C 1/10 | (2006.01) |

(52) U.S. Cl.
CPC .............. *C03B 5/43* (2013.01); *C03B 5/1672* (2013.01); *C03B 5/425* (2013.01); *C03C 3/078* (2013.01); *C03C 14/004* (2013.01); *C03C 27/02* (2013.01); *C22C 1/10* (2013.01); *C23C 22/73* (2013.01); *C23D 5/00* (2013.01); *F27D 1/0006* (2013.01); *C03C 2214/04* (2013.01); *C03C 2214/08* (2013.01)

(58) Field of Classification Search
CPC .................................. C03B 5/43; C23C 22/73
See application file for complete search history.

(56) References Cited

U.S. PATENT DOCUMENTS

| | | |
|---|---|---|
| 3,136,658 A | 6/1964 | Richards |
| 3,266,789 A | 8/1966 | Henry et al. |
| 3,436,203 A | 4/1969 | Wu |

(Continued)

FOREIGN PATENT DOCUMENTS

| | | |
|---|---|---|
| EP | 0499656 A1 | 8/1992 |
| GB | 520189 | 4/1940 |
| JP | 56088831 A  * | 7/1981 |

OTHER PUBLICATIONS

PCT International Search Report and Written Opinion, International Serial No. PCT/US2016/026734, International Filing Date: Apr. 8, 2016, Applicant: Owens-Brockway Glass Container Inc., dated: Jul. 13, 2016.

*Primary Examiner* — Queenie S Dehghan

(57) ABSTRACT

A nanocomposite material that can withstand prolonged contact with molten glass and glass precursor melts may include a cermet substrate and a glass reaction material overlying the cermet substrate. The cermet substrate may include a refractory metal matrix and ceramic particles embedded in the refractory metal matrix, and the glass reaction material may be the reaction product of molten glass and the cermet substrate in an inert environment. The nanocomposite material can be used to construct any kind of structure, such as an impeller or a vessel liner, that may be exposed to molten glass or glass precursor melts.

15 Claims, 2 Drawing Sheets

(56) References Cited

U.S. PATENT DOCUMENTS

| | | | |
|---|---|---|---|
| 3,986,857 A * | 10/1976 | Cerutti | C03B 18/04 65/182.5 |
| 4,099,952 A | 7/1978 | Schwenninger | |
| 4,183,746 A * | 1/1980 | Pearce | C04B 35/71 419/10 |
| 4,268,564 A | 5/1981 | Narasimhan | |
| 4,613,549 A | 9/1986 | Tanaka | |
| 4,748,136 A | 5/1988 | Mahulikar et al. | |
| 4,882,212 A | 11/1989 | SinghDeo et al. | |
| 4,883,778 A | 11/1989 | SinghDeo et al. | |
| 5,024,883 A | 6/1991 | SinghDeo et al. | |
| 5,320,988 A * | 6/1994 | Corrigan | B01J 3/062 501/96.4 |
| 6,124,040 A | 9/2000 | Kolaska et al. | |
| 7,189,342 B2 * | 3/2007 | Ferguson | C04B 35/117 252/512 |
| 7,579,085 B2 | 8/2009 | Hazel | |
| 7,767,305 B1 | 8/2010 | Stewart et al. | |
| 7,951,459 B2 | 5/2011 | Tang et al. | |
| 7,998,604 B2 | 8/2011 | Reynolds et al. | |
| 8,101,272 B1 | 1/2012 | Schmidt | |
| 8,105,692 B2 | 1/2012 | Dumm et al. | |
| 8,231,958 B2 | 7/2012 | Hoover et al. | |
| 2006/0246275 A1 | 11/2006 | Dumm et al. | |
| 2007/0292690 A1 | 12/2007 | Schmidt | |
| 2008/0003357 A1 | 1/2008 | Schmidt et al. | |
| 2008/0057275 A1 | 3/2008 | Grzesik et al. | |
| 2009/0130446 A1 | 5/2009 | Schmidt et al. | |
| 2009/0169742 A1 | 7/2009 | Hazel | |
| 2010/0218855 A1 | 9/2010 | Coupland et al. | |
| 2011/0200759 A1 | 8/2011 | Tang et al. | |
| 2012/0034440 A1 | 2/2012 | Schmidt | |
| 2012/0079700 A1 | 4/2012 | Schmidt | |
| 2015/0093058 A1 * | 4/2015 | Hunt | B22D 19/14 384/129 |
| 2016/0039702 A1 * | 2/2016 | Nagai | C03C 3/087 65/134.9 |

* cited by examiner

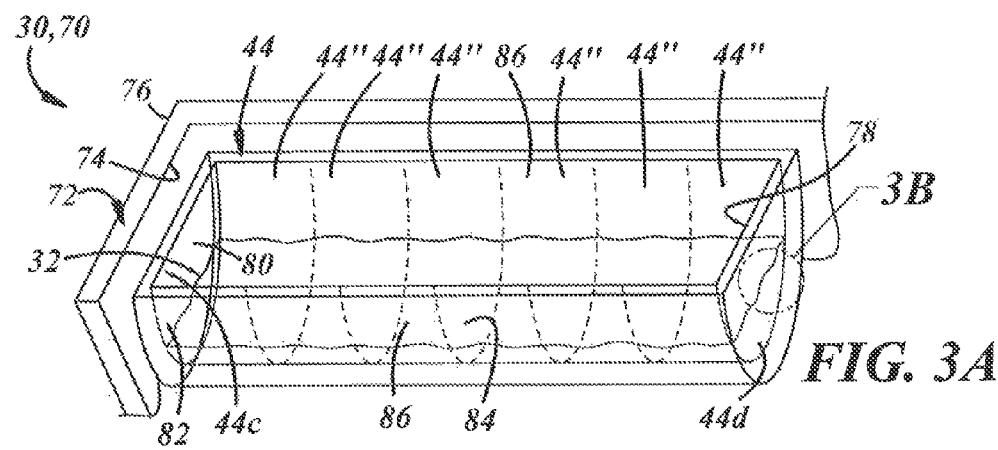
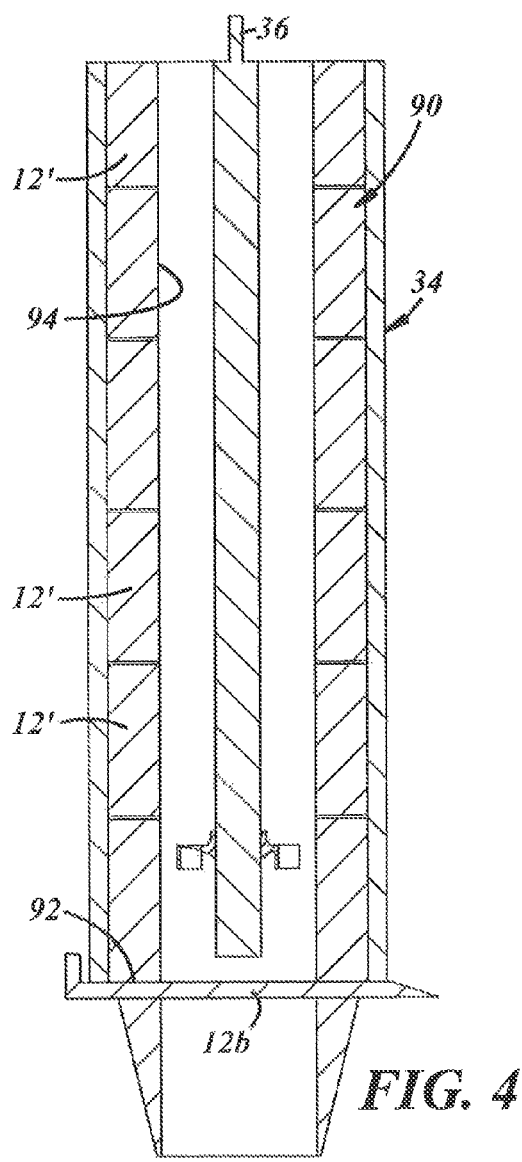
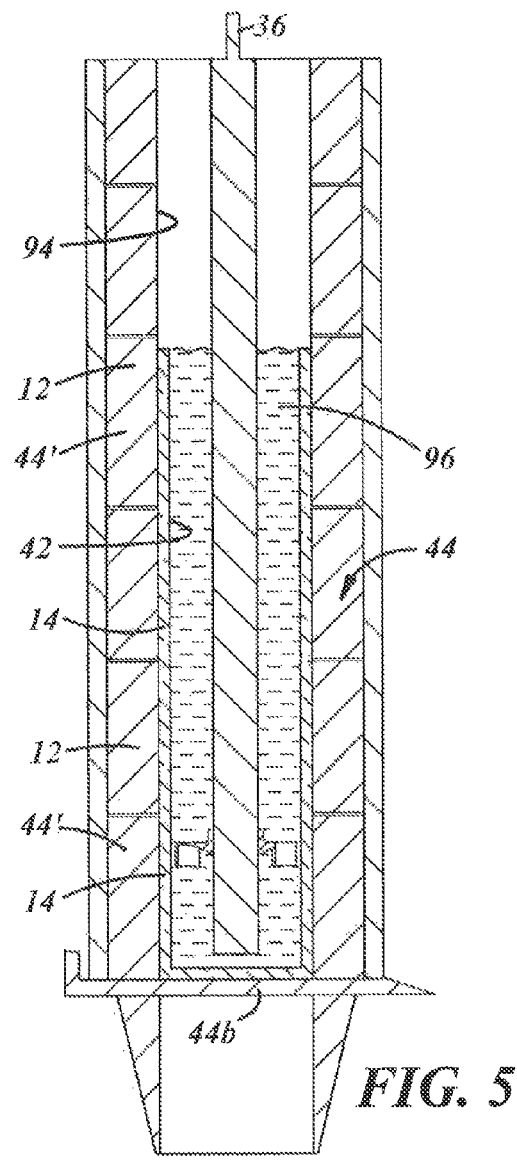

NANOCOMPOSITE MATERIAL

The present disclosure is directed to nanocomposite material that can withstand contact with molten glass and molten glass precursor melts for a substantial period of time and, more particularly, to a nanocomposite material that includes a cermet substrate and a glass reaction material overlying the cermet substrate.

BACKGROUND AND SUMMARY OF THE DISCLOSURE

The manufacture of glass articles (containers, sheets, etc.) involves handling various molten substances at temperatures in excess of 1400° C. In particular, glass forming materials may be melted and reacted to form molten glass in a vessel such as a furnace, melter, or tank. The molten glass is typically held in the vessel so that it can be refined and homogenized to achieve a consistent composition that is suitably free from defects before it can be thermally conditioned and formed into the desired article. The glass-forming material may be composed of a wide range of ingredients. For example, in the manufacture of soda-lime-silica glass articles, the glass-forming materials can include virgin raw materials (e.g., quartz silica, soda ash, limestone, etc.), pre-reacted glass reaction materials such as sodium silicate ($Na_2O.SiO_2$) and wollastonite ($CaSiO_3$), cullet, and a variety of other materials like fining agents, colorants, oxidizers, reducers, etc., as is well known in the art. Other glass batch formulations are also known for making soda-lime-silica glass as well as other types of glass including borosilicate glass.

Molten glass and, in particular, glass precursor melts, are quite chemically active. The term "molten glass," as used herein, refers to the final molten composition of the glass-forming materials that will eventually be processed into a glass article of the same chemical makeup. For example, in the manufacture of soda-line-silica glass articles, the attained molten glass has a chemical composition that comprises about 60 wt. % to about 80 wt. % silica ($SiO_2$), about 8 wt % to about 18 wt. % sodium oxide ($Na_2O$), about 5 wt. % to about 15 wt. % calcium oxide (CaO), and optionally about 0-2 wt. % alumina ($Al_2O_3$), about 0-4 wt. % magnesia (MgO), about 0-1.5 wt. % potash ($K_2O$), about 0-1 wt. % iron oxide ($Fe_2O_3$), about 0-0.5 wt. % titanium oxide ($TiO_2$), and about 0-0.5 wt. % sulfur trioxide ($SO_3$). The chemical harshness of the molten glass can be attributed to some or all of the various oxide compounds it contains. Glass precursor melts can be just as, and in certain instances, more chemically harsh than molten glass. The term "glass precursor melt," as used herein, refers to intermediate molten phases of the molten glass—for example, molten sodium silicate and other early-stage molten phases—that are combined and assimilated with the molten phases of the other glass-forming materials to become molten glass. Put differently, glass precursor melts are intermediate contributing components of the final molten glass composition.

The vessel(s) in which the glass-forming materials are melted and the resultant molten glass is refined and homogenized are typically lined with refractory bricks formed of zirconia, mixture of zirconia, alumina, and silica, or some other suitable refractory material. These types of traditional liners—while effective for some time—are not everlasting. They are susceptible to corrosion and erosion over time by molten glass and glass precursor melts, albeit at a slow enough rate to permit glass production to occur on a commercial scale. Eventually, when the vessel liner wears out, the entire vessel has to be taken off-line so that some or all of the liner can be replaced or repaired. This is a time-consuming and expensive process. Other structures that are made from similar refractory materials and are exposed to molten glass and glass precursor melts, such as impellers, face the same types of challenges.

One or more embodiments set forth in the present disclosure may provide a robust nanocomposite material that can effectively withstand the degenerative effects of molten glass and glass precursor melts for a substantial period of time. The nanocomposite material can be used to construct any kind of structure that will come in contact with molten glass and/or glass precursor melts such as, for example, a vessel liner or an impeller.

The present disclosure embodies a number of aspects that can be implemented separately from or in combination with each other.

A nanocomposite material in accordance with one aspect of the disclosure includes a cermet substrate and a glass reaction material overlying the cermet substrate. The cermet substrate may include a refractory metal matrix and ceramic particles embedded in the refractory metal matrix. The overlying glass reaction material may be the reaction product of molten glass and a surface of the cermet substrate in an inert environment.

In accordance with another aspect of the disclosure, there is provided a vessel in which glass-forming materials are melted and reacted to form molten glass. The vessel comprises an outer shell and a protective nanocomposite liner located inside the outer shell. The protective nanocomposite liner defines a vessel space where the glass-forming materials are melted and reacted. The protective nanocomposite liner includes, but is not limited to, a cermet substrate and a glass reaction material overlying a side of the cermet substrate that is adjacent to the vessel space. The cermet substrate may include a refractory metal matrix and ceramic particles embedded in the refractory metal matrix and the glass reaction material may be the reaction product of molten glass and the cermet substrate in an inert environment.

In accordance with yet another aspect of the disclosure, there is provided a structure for contacting molten glass, glass precursor melts, or both. The structure is made by a process that includes the steps of (1) providing a cermet substrate that comprises a refractory metal matrix and ceramic particles embedded in the refractory metal matrix, and (2) contacting a side of the cermet substrate with molten glass in an inert environment to form a glass reaction material over the cermet substrate.

BRIEF DESCRIPTION OF THE DRAWING

The disclosure, together with additional objects, features, advantages and aspects thereof, will be best understood from the following description, the appended claims and the accompanying drawings, in which:

FIG. 3A is schematic cross-sectional view of a vessel that includes an embodiment of the nanocomposite material in the form of a protective nanocomposite liner;

FIGS. 4-5 are schematic cross-sectional views of a vessel that visually demonstrates an example of how a protective nanocomposite liner can be made.

DETAILED DESCRIPTION

Figure 1:
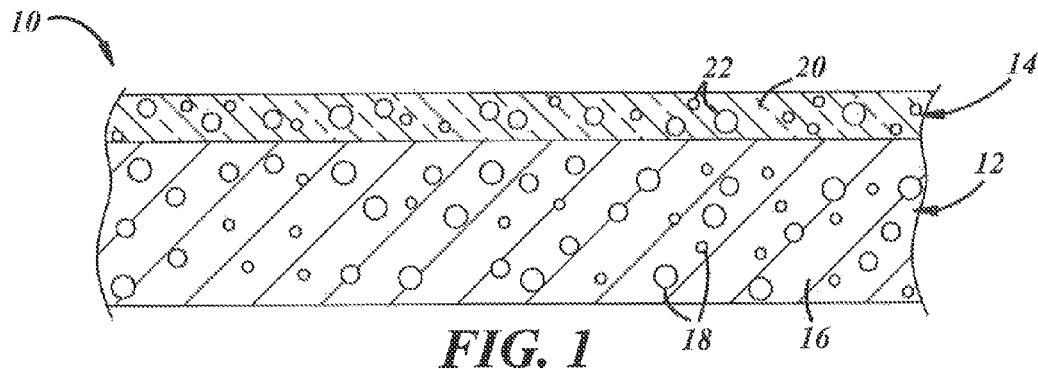
FIG. 1 is an idealized cross-sectional view of a nanocomposite material in accordance with an illustrative embodiment of the present disclosure.

A nanocomposite material 10 that can withstand extended contact with molten glass and glass precursor melts (hereafter collectively referred to as "molten glass substances") is shown generally in FIG. 1. The nanocomposite material 10 may be used to construct any type of structure—such as an impeller or a protective liner for making and containing molten glass substances inside a vessel—that may come into contact with molten glass substances for any length of time. In terms of its compositional make-up, the nanocomposite material 10 comprises a cermet substrate 12 and a glass reaction material 14 that overlies the cermet substrate 12 so that it confronts and contacts the hot molten glass substances. The cermet substrate 12 and the glass reaction material 14 cooperatively impart a degree of corrosion, erosion, and heat resistance to the nanocomposite material 10 that is attractive to glass article manufacturers.

The cermet substrate 12 includes a refractory metal matrix 16 and ceramic particles 18 that are embedded in the refractory metal matrix 16. Each of these constituent materials 16, 18 has a high melting point and is generally chemically inert in a wide range of environments. Such robust characteristics are largely responsible for the ability of the cermet substrate 12 to resist attach by molten glass substances for sustained periods. And while the proportional amounts of the refractory metal matrix 16 and the ceramic particles 18 in the cermet substrate 12 may vary, depending on the exact properties desired, the cermet substrate 12 preferably contains about 20 wt. % to about 50 wt. %, and all ranges and subranges therebetween, of the refractory metal matrix 12 and about 50 wt. % to about 80 wt. %, and all ranges and subranges therebetween, of the ceramic particles 18. Other materials may of course be included in the cermet substrate 12 in addition to the two constituent materials 16, 18 just mentioned.

The refractory metal matrix 16 may be composed of molybdenum (Mo), tantalum (Ta), tungsten (W), rhenium (Re), or an alloy of any two or more of those elemental refractory metals, in one embodiment, for example, the refractory metal matrix 16 may be composed of 100 wt. % molybdenum (plus industry-accepted amounts of impurities) or a molybdenum-tantalum alloy in which molybdenum is present at about 80 wt. % to about 90 wt. % and tantalum is present at about 10 wt. % to about 20 wt. %. The ceramic particles 18 embedded in the refractory metal matrix 16 may include ceramic particles such as nitrides, carbides, carbonitrides, and borides, with a preferred ceramic particle being silicon carbonitride (SiCN). These particles 18 can have various sizes. Preferably, however, the ceramic particles 18 have an average size of about 1 μm to about 5 μm.

The glass reaction material 14 directly overlies the cermet substrate 12 and is the reaction product of soda-lime-silica (SLS) molten glass at 1450° C. or greater and the cermet substrate 12 in an inert environment. The glass reaction material 14 may include a number of reaction products. In particular, the glass reaction material 14 has a glassy base layer 20 that may include embedded particles 22.

The glassy base layer 20 is a SLS molten glass-modified derivative phase of the refractory metal matrix 16 located on the surface of the cermet substrate 12 that is brought into contact with the SLS molten glass. It is less susceptible to corrosion from molten glass substances than the refractory metal matrix 16 due to the formation of complex phase materials that result when the corrosive molten oxides react with the refractory metal or alloy. For example, in a preferred embodiment, when exposed to SLS molten glass, the composition of which is noted above, the molten glass reacts with the refractory metal matrix 16 of the cermet substrate 12 to form high-melting point complex phase materials such as refractory metal suicides and oxides. One particularly notable refractory metal silicide that may comprise the glassy base layer 20 is a molybdenum silicide, such as molybdenum disilicide, which has a high oxidation resistance up to temperatures that exceed the temperature of molten glass. Molybdenum silicides can be formed when refractory metal matrix 16 is molybdenum or a molybdenum-based alloy.

The particles 22 that may be included in the glassy base layer 20 include the same kinds of ceramic particles that are embedded in the refractory metal matrix 16 as well as particles composed of some or all of the following materials: refractory oxides, elemental refractory metals, oxycarbides, oxynitrides, oxycarbonitrides, and materials derived from the main ingredients of the molten glass (silica, calcium, and sodium for SLS molten glass). The particles 22 can be the same kinds as those found in the cermet substrate 12 because the ceramic particles 18 nearest to the side of the cermet substrate 12 that is exposed to the molten glass may be adopted into the glassy base layer 20 as it is being formed or, alternatively, they may be produced by reaction of the molten glass and the cermet substrate 12. The other types of particles listed above can be produced and incorporated into the glass base layer 20 through reactions between molten glass and the cermet substrate 12 at high temperatures in an inert environment.

The creation of the glass reaction material 14 has a passivating effect. To be more specific, upon initial exposure in an inert environment, the corrosive SLS molten glass contacts and diffuses into the cermet substrate 12. The corrosive oxides react with the refractory metal matrix 16 to produce the glass reaction material 14 which, in turn, inhibits further reaction between the molten SLS glass and the refractory metal matrix 16. As such, the glass reaction material 14 is not as thick as the adjacent and adjoining refractory metal matrix 16 of the cermet substrate 12. Indeed, the glassy base layer 20 is usually about 5% to about 25% as thick as the cermet substrate 12, including all ranges and subranges therebetween, although thicknesses outside of this range are certainly possible. The glass reaction material 14, when fully produced, minimizes oxide diffusion into the cermet substrate, thereby limiting the growth and thickness of the glass reaction material 14 as previously noted, and additionally provides a less-reactive barrier between the molten glass substances and the cermet substrate 12 that guards against corrosion and dissolution of the cermet substrate 12 over time as compared to traditional refractory liners.

A few specific examples of the nanocomposite material 10 may be helpful in understanding its construction. In this particular example, the cermet substrate 12 is a molybdenum-tantalum alloy matrix that includes embedded silicon carbonitride (SiCN) particles. When the cermet substrate 12 is brought into contact with SLS molten glass in a nitrogen ($N_2$) atmosphere, thermodynamic calculations performed by Thermocalc software indicated that a glassy base layer would be formed at the surface of the cermet substrate that interfaces with the SLS molten glass. Those same calculations also indicated that certain types of particles would be embedded in the glassy base layer. The identified particles included at least tantalum oxide (a refractory oxide), calcium silicate (a material derived from the silica in molten glass), tantalum carbide (a carbide), modified quartz (a material derived from the silica in the SLS molten glass), and elemental molybdenum (elemental refractory metals).

Another specific example of the nanocomposite material 10 can be made by bringing the cermet substrate just mentioned in the previous example (Mo—Ta alloy matrix with embedded SiCN ceramic particles) into contact with the SLS molten glass in an argon (Ar) atmosphere as opposed to a nitrogen atmosphere. When doing so, thermodynamic calculations performed by Thermocalc software indicated that a glassy base layer would be formed at the surface of the cermet substrate that interfaces with the SLS molten glass, like before, but that different types of particles would be embedded in the glassy base layer. The identified particles included in the glassy base layer in this example included at least molybdenum oxide to refractory oxide), tantalum nitride (a nitride), and $Na_2O_5SiO_2$ (a material derived from the silica in the SLS molten glass).

Figures 2A, 2B, 3B:
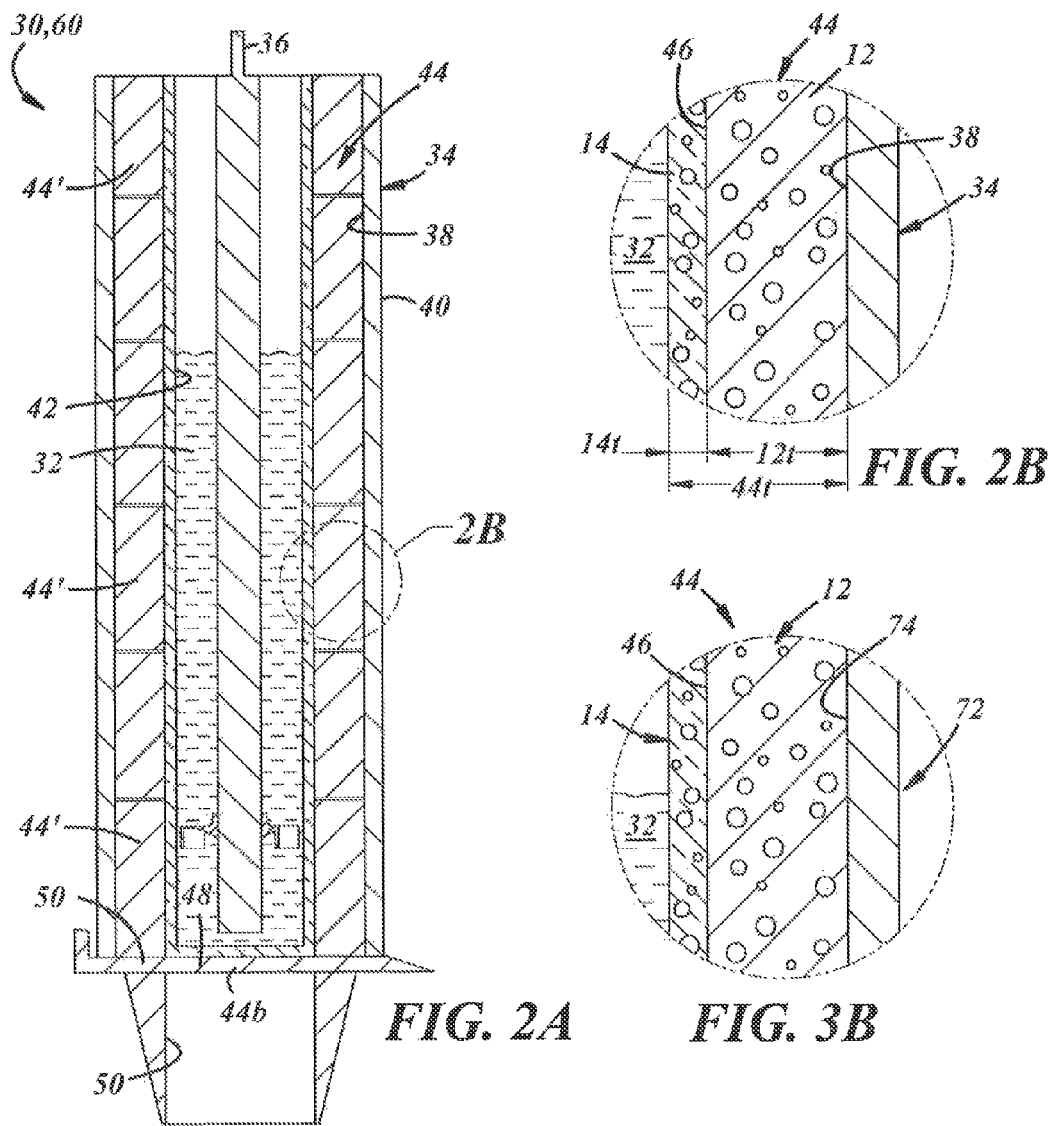
FIG. 2A is schematic cross-sectional view of a vessel that includes an embodiment of the nanocomposite material in the form of a protective nanocomposite liner.
FIG. 2B is a magnified partial view of the encircled portion of the vessel shown in FIG. 2A.
FIG. 3B is a magnified partial view of the encircled portion of the vessel shown in FIG. 3A.

Referring now to FIGS. 2A-2B and FIGS. 3A-3B, the nanocomposite material 10 may be used to construct a protective nanocomposite liner 44 on the inside of a vessel 30 that at some point holds molten glass and/or a glass precursor melt 32 (collectively "molten glass substances"). The vessel 30 may be a furnace, a molter, a tank, or any other structure in which glass-forming materials are melted and reacted to eventually form the molten glass, either continuously or in a batch reaction, for production into glass articles. In FIGS. 2A-2B, the vessel 30 shown and described is a batch process tank 60. The tank 60 includes an outer shell 34 that surrounds the protective nanocomposite liner 44 and a spinnable impeller 36 for stirring the molten glass substances 32. The outer shell 34 provides the basic size and general supporting structure of the tank 60, and is typically composed of a metal such as molybdenum. Other types of metals not specifically mentioned here may of course be used to construct the outer shell 34 as is well appreciated by skilled artisans. The outer shell 34 includes an interior surface 38 and an exterior surface 40, and is outfitted with known structural features (e.g., piping, burners, access doors, etc.) that facilitate the glass-melting operations of the tank 60.

The protective nanocomposite liner 44 is situated adjacent to the interior surface 38 of the outer shell 34 and, as such, defines a vessel space 42 where the molten glass substances 32 are produced and maintained until the resultant molten glass being prepared is ready for further downstream processing. In this way, as shown, the protective nanocomposite liner 44 contacts the molten glass substances 32 contained in the vessel space 42 and shields the outer shell 34 from the molten glass substances 32 and their corresponding elevated temperatures and corrosive effects. The glass reaction material 14 overlies a side 46 of the cermet substrate 12 that is adjacent to the vessel space 42 so that the glass reaction material 14 contacts the molten glass substances 32. This ordered arrangement is preferred since the glass reaction material 14 is thought to be less reactive when in contact with the molten glass substances 32 than the cermet substrate 12. The protective nanocomposite liner 44 as used in the vessel 30 may have a thickness 44$t$ that ranges from about 10.5 mm to about 25 mm, with the cermet substrate 12 having a thickness 12$t$ that may range from about 10 mm to about 20 mm, including all ranges and subranges therebetween, and the glass reaction material 14 having a thickness 14$t$ that may range from about 0.5 mm to about 5 mm, including all ranges and subranges therebetween.

In this embodiment, the protective nanocomposite liner 44 may comprise a bottom liner segment 44$b$ and a plurality of vertically stacked detachable side liner segments 44'. The bottom liner segment 44$b$ has an axially closed base 48 and a peripheral portion 50 that circumferentially surrounds the base 50, and is slidable in a direction transverse to the main longitudinal axis of the tank 60 to selectively open the vessel space 42 to a chute 50. At least the base 48 of the bottom liner segment 44$b$ includes the glass reaction material 14 as shown in FIG. 2A. When arranged into the protective nanocomposite liner 44, the detachable side liner segments 44' are vertically stacked on, and supported by, the peripheral portion 50 of the bottom liner segment 44$b$ to establish the vessel space 42 while permitting relative sliding movement to occur between the bottommost side liner segment 44' and the underlying bottom liner segment 44$b$. Each of the side liner segments 44' constitutes an annular peripheral piece of the nanocomposite liner 44 that arises from the bottom liner segment 44$b$. The several side liner segments 44' are connected to one another when aligned in end-to-end abutment by detachable connections such as, for example, dove-tail type connections.

Forming the protective nanocomposite liner 44 out of the bottom liner segment 44$b$ and the plurality of detachable side liner segments 44' allows for targeted repair and replacement of the nanocomposite liner 44 if for some reason a defined part of the liner 44 becomes defective but the rest remains in satisfactory working condition. For example, if damage occurs to a localized area of the protective nanocomposite liner 44, the liner segment or segments 44' that embrace that area can be replaced, which is a quicker and less expensive alternative to replacing the entire protective nanocomposite liner 44 as has customarily been the case with previously-known unitary refractorybrick vessel liners.

In another embodiment, as shown in FIGS. 3A-3B, the vessel 30 may be a continuous process furnace 70, and the protective nanocomposite liner 44 may be constructed for use in the furnace 70. Here, in this embodiment, the furnace 70 includes an outer shell 72 that surrounds the protective nanocomposite liner 44. The outer shell 72, like before, provides the basic size and general supporting structure of the furnace 70, and is typically composed of a metal such as molybdenum. The outer shell 72 includes an interior surface 74 and an exterior surface 76, and is outfitted with known structural features (e.g., piping, burners, access doors, etc.) that facilitate the glass-melting operations of the furnace 70. The protective nanocomposite liner 44 is disposed inside the outer shell 72 and defines a vessel space 78 where the molten glass substances 32 are produced and maintained until the resultant molten glass being prepared is ready for further downstream processing. The protective nanocomposite liner 44 thus contacts the molten glass substances 32 contained in the vessel space 78 and shields the outer shell 72 from the molten glass substances 32. And, similar to before, the glass reaction material 14 overlies a side 46 of the cermet substrate 12 that is adjacent to the vessel space 42 so that the glass reaction material 14 contacts the molten glass substances 32, as shown best in FIG. 3B.

The protective nanocomposite liner 44 used in conjunction with the furnace 70 may be comprised of a first end liner segment 44$c$, a second end liner segment 44$d$, a plurality of detachable side liner segments 44" that extend horizontally between the first and second end liner segments 44$c$, 44$d$. In this embodiment, as shown, each of the first and second end liner segments 44c, 44d includes an axially-closed base 80 and a peripheral portion 82 that surrounds three sides of the base 80. The peripheral portion 82 may be raised, indented, or contiguous relative to the base 80. When assembled into the nanocomposite protective liner 44, the end liner segments 44c, 44d are spaced apart and the detachable side liner segments 44" are horizontally stacked between the peripheral portions 82 of the first and second end liner segments 44c, 44d to establish the vessel space 78. Specifically, each of the detachable side liner segments 44" is generally U-shaped and includes a bottom wall 84 and two upstanding side walls 86 that are aligned with and extend between the peripheral portions 80 of the first and second end liner segments 44e, 44d when the side liner segments 44" are aligned in end-to-end abutment. Any type of detachable connection, including the previously mentioned ones, may be employed to connect the first and second end liner segments 44c, 44d and the plurality of side liner segments 44.

A method of making and using the protective nanocomposite liner 44 in the context of either vessel 30 described above (tank 60 or furnace 70) involves at least the steps of (1) providing the protective liner 44 on the inside of the outer shell 34, 72 to define the vessel space 42, 78 and (2) contacting the protective nanocomposite liner 44 with the molten SLS glass. As explained above, the protective nanocomposite liner 44 can withstand erosion, corrosion, and thermal degradation when in contact with the molten glass substances 32 so as to afford the vessel 30 with an acceptable service life. Its multi-part construction also makes the protective nanocomposite liner 44 easier to maintain over time since the development of localized liner defects does not necessarily require that the entire liner 44 be replaced; instead, the replacement of only the specific liner segment(s) 44b, 44c, 44d, 44', 44" that encompass the defects may be sufficient. These features of the protective nanocomposite liner 44 make it a viable alternative to the unitary refractory-brick liners that have long been used to protect vessels against the degenerative activity of the molten glass substances 32.

The protective nanocomposite liner 44 can be provided in numerous ways. In a preferred embodiment, as shown in FIGS. 4-5 and in the context of the tank 60, a cermet precursor liner 90 is first assembled. The cermet precursor liner 90 may be assembled from a plurality of cermet substrates that include a cermet bottom substrate 12b and a plurality of annular cermet side substrates 12' in the same shape as the detacheable side liner segments 44' sought to be formed. These cermet liner substrates 12b, 12' may be formed by spark plasma sintering or some other suitable technique. Spark plasma sintering may include a powder consolidation technique in which high amperage DC current pulses are used to generate internal heat within the powder that is sufficient to melt and fuse the powder, while under compaction, into its final solid shape of the prescribed density and embedded particle concentration. Once formed, the cermet bottom substrate 12b is placed under the outer shell 34 at a corresponding bottom location, and one of the individual annular cermet side substrates 12' is supported within the outer shell 34 on a perimeter portion 92 of the cermet bottom substrate 12b. Additional annular cermet side substrates 12' are then stacked, one-by-one, in aligned abutment with the previously-laid cermet bottom substrate 12' and are connected in place by, for example, dove-tail type connections. The annular cermet side substrates 12' are stacked and connected until the cermet precursor liner 90 has appropriately defined an interior space 94 from which the vessel space 42 of the vessel 30 will be later derived. Alternatively, rather than piece together the cermet precursor liner 90 within the outer shell 34, it is possible to construct the precursor liner 90 outside of the outer shell 34 and to then slide the entire liner 90 as a single connected piece into the shell 34, among other possibilities.

The protective nanocomposite liner 44 is derived in-situ from the cermet precursor liner 90 when SLS molten glass 96 is introduced into the interior space 94 and brought into contact with the precursor liner 90 in an inert environment, as shown in FIG. 5. This can be accomplished by filling the interior space 94 with the SLS molten glass 96 in the presence of an inert gas such as, for example, nitrogen or argon. Filling the interior space 94 with SLS molten glass 96 can be carried out in numerous ways. In a preferred embodiment, for example, SLS glass-forming materials (e.g., quartz silica, soda, lime, cullet, etc) are first added into the interior space 94. After the glass-forming materials are loaded, a vacuum is drawn in the interior space 94 by a pump or other mechanism. The vacuum drawn in the interior space 94 may reach $10^{-4}$ atm or lower (i.e., stronger vacuum). After a suitable vacuum is achieved, the interior space 94 is back filled with the inert gas and the interior space 94 is maintained at a positive pressure of, for example, 1.0-1.2 atm. Next, the glass-forming materials are melted into SLS molten glass 96, usually by heating the materials to a temperature in excess of 1450° C. for a period of at least 16 hours.

The SLS molten glass 96, once introduced into the interior space 94, reacts in the oxygen-free environment with the portion (some or all) of the cermet precursor liner 90 that is exposed to the SLS molten glass 96. This exposure, as previously described, forms the glass reaction material 14 over the various exposed cermet substrates 12b, 12' that constitute the liner 90. The vessel space 42 is now provided inward of the glass reaction material 14. After being used to derive the protective nanocomposite liner 44, that particular charge of molten glass 96 may be delivered downstream from the vessel 30 and manufactured into glass articles or, alternatively, it may be a dedicated molten glass charge that is used only to derive the protective nanocomposite liner 44 after which time it may be discarded or recycled. The above description related to the formation of the nanocomposite liner 44 in the context of the tank 60 is similarly applicable to the furnace 70 with the main difference being the shape of the liner 44 and the fact that the cermet precursor liner 90 is assembled to ultimately provide the liner 44 with first and second end liner segment 44c, 44d as opposed to a single bottom liner segment 44b, and a plurality of detachable side liner segments 44" that extend horizontally between the first and second end liner segments 44c, 44d.

After being cultivated in-situ within the vessel 30, the protective nanocomposite liner 44 is exposed to whatever molten glass substances are introduced into the contained space 42 during operation of the vessel 30. The molten glass substances are no longer required to be present in vessel space 42 under an inert environment once the nanocomposite liner 44 has been formed since the function of the inert gasses was merely to facilitate in-situ formation of the liner 44. The molten glass substances can be introduced into the vessel space 42 by melting and stirring a defined amount of a batch of glass-forming materials (as would be the case with the tank 60 shown in FIG. 3) or it can be introduced by adding glass-forming materials to a molten glass bath that is continuously progressing through the space 42 (as would be the case with the furnace 70 shown in FIG. 4). But no matter how the molten glass substances are introduced into the vessel space 42, 78 of the vessel 30, the protective nanocomposite liner 44 can survive many hours of intimate exposure on account of the robust thermal and chemical resistance of both of the glass reaction material 14 and the underlying cermet substrate 12.

There thus has been disclosed a nanocomposite liner that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, instead of being formed in-situ within the outer shell 34, the protective nanocomposite liner 44 shown in FIG. 2A-2B could be provided by forming the cermet substrates 12b, 12' and reacting them with the SLS molten glass 94 to form the overlying glass reaction material 14 on each cermet substrate 12b, 12' at a location removed from the outer shell 34 with the cermet substrates 12b, 12' not yet being attached. The resultant liner segments 44' could then be brought to, and connected together within, the outer shell 34 to eventually form the protective nanocomposite liner 44. The disclosure is intended to embrace all such modifications and variations as fall within the spirit and broad scope of the appended claims.

The invention claimed is:

1. A nanocomposite material that can withstand contact with molten glass and molten glass precursor melts, the nanocomposite material including:
   a cermet substrate that includes a refractory metal matrix and ceramic particles embedded in the refractory metal matrix, wherein the refractory metal matrix is molybdenum, tantalum, tungsten, rhenium, or an alloy of any two or more of those elemental refractory metals, and wherein the ceramic particles embedded in the refractory metal matrix comprise at least one of nitrides, carbides, carbonitrides, borides, or mixtures thereof; and
   a glass reaction material overlying the cermet substrate, the glass reaction material being the reaction product of soda-lime-silica molten glass and a surface of the cermet substrate in an inert environment, wherein the glass reaction material is thinner than the cermet substrate and comprises a glassy base layer that includes embedded particles, and wherein the glassy base layer is a molten glass-modified derivative phase of the refractory metal matrix of the cermet substrate.

2. The nanocomposite material set forth in claim 1, wherein the refractory metal matrix included in the cermet substrate is molybdenum or a molybdenum-tantalum alloy, and the ceramic particles embedded in the refractory metal matrix comprise at least silicon carbonitride particles.

3. The nanocomposite material set forth in claim 1, wherein the particles that are embedded in the glassy base layer comprise at least one of the ceramic particles that are included in the cermet substrate, refractory oxides, elemental refractory metals, oxycarbides, oxynitrides, oxycarbonitrides, materials derived from the main ingredients of the soda-lime-silica molten glass, or mixtures thereof.

4. A vessel in which glass-forming materials are melted and reacted to form molten glass, the vessel comprising:
   an outer shell; and
   a protective nanocomposite liner located inside the outer shell and defining a vessel space where glass-forming materials are melted and reacted to form molten glass, the protective nanocomposite liner comprising a cermet substrate and a glass reaction material overlying a side of the cermet substrate that is adjacent to the vessel space so that the glass reaction material contacts the molten glass, the cermet substrate including a refractory metal matrix and ceramic particles embedded in the refractory metal matrix and the glass reaction material being the reaction product of molten glass and the cermet substrate in an inert environment, the glass reaction material being thinner than the cermet substrate;
   wherein the refractory metal matrix included in the cermet substrate is molybdenum, tantalum, tungsten, rhenium, or an alloy of any two or more of those elemental refractory metals, and the ceramic particles embedded in the refractory metal matrix comprise at least one of nitrides, carbides, carbonitrides, borides, or mixtures thereof;
   wherein the glass reaction material comprises a glassy base layer that includes embedded particles, the glassy base layer being a molten glass-modified derivative phase of the refractory metal matrix of the cermet substrate.

5. The vessel set forth in claim 4, wherein the refractory metal matrix included in the cermet substrate is molybdenum or a molybdenum-tantalum alloy, and the ceramic particles embedded in the refractory metal matrix comprise at least silicon carbonitride particles.

6. The vessel set forth in claim 4, wherein the protective nanocomposite liner includes a plurality of detachable liner segments.

7. The vessel set forth in claim 6, wherein the protective nanocomposite liner comprises a bottom liner segment and plurality of detachable side liner segments stacked vertically from a perimeter portion of the bottom segment.

8. The vessel set forth in claim 7, wherein the detachable side liner segments are individual annular peripheral pieces of the protective nanocomposite liner that are detachably connected in an end-to-end abutment.

9. The vessel set forth in claim 6, wherein the protective nanocomposite liner comprises a first end liner segment, a second end liner segment, and a plurality of detachable side liner segments that extend horizontally between the first and second end liner segments.

10. The vessel set forth in claim 9, wherein the detachable side liner segments are generally U-shaped and include a bottom wall and two upstanding side walls that are aligned with and extend between the first and second end liner segments when the side liner segments are aligned in end-to-end abutment.

11. A structure for contacting molten glass, glass precursor melts, or both, the structure being made by a process that includes the steps of:
   providing a cermet substrate that comprises a refractory metal matrix and ceramic particles embedded in the refractory metal matrix, the refractory metal matrix being molybdenum, tantalum, tungsten, rhenium, or an alloy of any two or more of those elemental refractory metals, and the ceramic particles embedded in the refractory metal matrix comprising at least one of nitrides, carbides, carbonitrides, borides, or mixtures thereof; and
   contacting the cermet substrate with soda-lime-silica molten glass in an inert environment to form a glass reaction material over the cermet substrate, the glass reaction material being thinner than the cermet substrate and comprising a glassy base layer that includes embedded particles, the glassy base layer being a molten glass-modified derivative phase of the refractory metal matrix of the cermet substrate.

12. The structure made according to the process set forth in claim 11, wherein the structure is a protective nanocomposite liner that defines a vessel space where glass-forming materials are melted and reacted to form molten glass, and wherein the step of providing the cermet substrate includes assembling a cermet precursor liner to define an interior space, the cermet precursor liner being assembled from at least a plurality of detachable cermet substrates.

13. The structure made according to the process set forth in claim 12, wherein assembling the cermet precursor liner comprises connecting a plurality of annular cermet side substrates to one another in end-to-end abutment such that the annular cermet side substrates arise vertically from a cermet bottom substrate.

14. The structure made according to the process set forth in claim 12, wherein assembling the cermet precursor liner comprises connecting a plurality of generally U-shaped cermet side substrates to one another in end-to-end abutment such that the generally U-shaped cermet side substrates extend horizontally between a first cermet end substrate and a second cermet end substrate.

15. The structure made according to the process set forth in claim 12, wherein the step of contacting the cermet substrate with the soda-lime-silica molten glass includes adding the soda-lime-silica molten glass into the interior space defined by the cermet precursor liner and bringing the soda-lime-silica molten glass into contact with the cermet precursor liner in an inert environment.

* * * * *